(12) United States Patent
Green

(10) Patent No.: US 6,307,505 B1
(45) Date of Patent: Oct. 23, 2001

(54) APPARATUS AND METHOD FOR COUPLING DATA TO A POSITION DETERMINATION DEVICE

(75) Inventor: James C. Green, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/256,159

(22) Filed: Feb. 24, 1999

Related U.S. Application Data

(63) Continuation-in-part of application No. 09/120,961, filed on Jul. 22, 1998.

(51) Int. Cl.[7] .............................. H04B 7/185; G01S 5/02
(52) U.S. Cl. .................................. 342/357.09; 342/357.1
(58) Field of Search ............................ 342/357.09, 357.1

(56) References Cited

U.S. PATENT DOCUMENTS 5,477,228 * 12/1995 Tiwari et al. .
5,877,725 * 3/1999 Kalafus ................................. 701/214
5,982,324 * 11/1999 Watters et al. ................... 342/357.06

OTHER PUBLICATIONS

Elrod et al, Satellite–Aided ATC System Concepts Employing the NAVSTAR Global Positioning System, pp. 180–185, Papers Published in NAVIGATION, vol. 1, The Institute of Navigation, Alexandria, VA., 1980.*

* cited by examiner

Primary Examiner—Theodore M. Blum
(74) Attorney, Agent, or Firm—Wagner Murabito & Hao, LLP

(57) ABSTRACT

A method and apparatus for coupling data from an external data device to a position determination device. An Auxiliary Data Transmission Unit (ADTU) that includes a radio transmitter couples to the external data device. The ADTU receives serial data from the external data device and encodes the received serial data into a format suitable for receipt by the position determination device. The encoded data is then modulated to produce a radio signal that is transmitted to the position determination device in a scheme that permits multiple devices to communicate with the position determination device without interference.

13 Claims, 17 Drawing Sheets

APPARATUS AND METHOD FOR COUPLING DATA TO A POSITION DETERMINATION DEVICE

This application is a continuation-in-part of Ser. No. 09/120,961 filed Jul. 22, 1998.

TECHNICAL FIELD

This invention relates to location determination systems. Specifically, the present invention relates to an apparatus and method for coupling data to a position determination device.

BACKGROUND ART

The Global Positioning System (GPS) consists of a constellation of orbiting satellites that transmit timing information and the satellite's ephemerides via microwave radio. Position determination devices determine position by analyzing signals received from four or more satellites. Any of a number of known methods can be used to determine position.

One frequently used method for determining position calculates pseudoranges that are then used to determine position. Pseudoranges are calculated by measuring the time it takes for the signal to travel from the satellite to the receiver. The satellites mark their transmissions digitally and the receiver compares the time it receives the time mark with its own time clock. The time delay, referred to as transit time, is typically in the range of about 70-90 milliseconds. Distance to each satellite (pseudorange) is then determined by multiplying transit time of each received signal by the speed of radio transmissions (approximately 300,000,000 meters/second).

Signals from each GPS satellite include the satellites ephemeris. The ephemeris indicates the location of each satellite. The position of the position determination device is then determined by a geometric calculation that uses the known satellite positions and calculated distances (pseudoranges). GPS based positions are calculated using the World Geodetic System of 1984 (WGS84) coordinate system. These positions are expressed in Earth Centered Earth Fixed (ECEF) coordinates of X, Y, and Z axes. These positions are often transformed into latitude, longitude, and height relative to the WGS84 ellipsoid.

One factor that introduces error into the process of determining location is atmospheric conditions. Another source of error results from the intentional introduction of error into the transmitted ephemerides and clock by the U.S. Air Force (referred to hereinafter as "selective availability" or "S/A"). The GPS navigation signals commonly available to civilian users are referred to as the standard positioning service (SPS). The accuracy of SPS is currently specified by the Department of Defense (DOD) to be within 100 meters horizontal position 95 percent of the time and 300 meters 99.99 percent of the time. Errors also result from atmospheric conditions. Though the specified horizontal accuracy may be adequate for some applications such as navigation of a vessel in the open ocean, other applications require an increased level of accuracy.

One method for obtaining a more accurate determination of position is known as Differential GPS (DGPS). DGPS systems receive correction data broadcast from a DGPS reference station. DGPS reference stations are located at fixed and known locations and each DGPS reference station transmits correction data. By using receiver correction data along with signals received directly from GPS satellites, DGPS systems can accurately determine position. DGPS systems typically determine position in one of two ways. Traditionally, positions have been calculated using code phase differential techniques. These are normally referred to as DGPS. More recently, carrier phase techniques have been used to determine position. These systems are referred to as Real Time Kinematic (RTK) systems.

DGPS reference stations may be dedicated facilities with permanent and/or extensive broadcast capabilities or may be simply a transient DGPS receiver with data transmitter located at a known location. DGPS reference stations transmit either their calculated corrections to the GPS signals or their actual observations of the GPS signals (raw data), or both. When transmitting calculated corrections, errors due to atmospheric (troposphere, ionosphere, etc.) and errors due to satellite timing/clock (both intentional and process noise) are represented by the correction value. The application of these corrections at a DGPS receiver will compensate for these error sources.

Differential GPS reference stations may also transmit their observations of the GPS signals for each satellite. This method of transmission is popular with RTK positioning techniques and systems due to the nature of typical RTK processing methods. When using this type of data format, errors associated with atmospherics and satellite timing/clock errors are removed at the moving/roving/differential GPS receiver. Most manufacturers of RTK systems typically broadcast this data in a format unique to the particular manufacturer.

Many of the GPS reference stations broadcast in a format that conforms to standards established by the Radio Technical Commission for Maritime services (RTCM). These standards specify format, communication bands, and messages for a differential correction GPS service. Correction data that conforms to the RTCM format is broadcast by the US Coast Guard and others to assist in maritime navigation. The US Coast Guard has regional DGPS reference stations that calculate and broadcast correction data using the RTCM format. The RTCM correction data broadcast by some US Coast Guard DGPS reference stations includes carrier phase observable data while data broadcast by other facilities only includes code phase correction data. Other agencies and port authorities throughout the world broadcast differential correction signals conforming to the RTCM format for navigation in and around coastal areas. Both raw observable data and RTCM "correction data" are referred to hereinafter as "correction data" since both forms of data allow for correction to be made to position.

FIG. 1 shows a prior art position determination system 10 for determining position using correction data originating from a DGPS Reference Station that transmits in a RTCM format. Position determination system 10 is shown to include housing 17 that contains beacon antenna 11 and beacon receiver 13. Housing 18 is shown to include GPS antenna 12 and GPS receiver 14. Both housing 17 and housing 18 are coupled to a third housing that contains DGPS processor 19 by electrical cable. Battery 15 is connected by electrical cable to DGPS processor 19 for providing electrical power to the components of position determination system 10. Data logger 16 is also shown to be coupled via electrical cable to DGPS processor 19. Data logger 16 typically includes a display and function keys so as to allow users to view output and to input data as required for the operation of position determination system 10. In operation, beacon antenna 11 receives differential correction signals from a Reference Station that broadcasts in a RTCM format and couples the signals to beacon receiver 13. Beacon receiver 13 demodulates the RTCM signals so as to obtain correction data that is then coupled to DGPS processor 19. GPS antenna 12 receives signals from satellites of the GPS and couples the signals to GPS receiver 14. GPS receiver 14 demodulates the signals from GPS satellites and processes the incoming data, which is then coupled via electrical cable to DGPS processor 19. DGPS processor 19 then uses the data from beacon receiver 13 and GPS receiver 14 to accurately determine position.

One proposed new system for correcting position determination signals from satellites is the Wide Area Augmentation System (WAAS). The WAAS is designed for use with aircraft operations. The WAAS is designed to provide a system that has sufficient integrity such that position may be determined with sufficient reliability and accuracy for aircraft operations. The WAAS includes satellites for transmitting signals and a ground network that augments GPS such that GPS may be used as a primary navigation sensor for aircraft. The WAAS augments GPS with a ranging function, (which improves availability and reliability), differential GPS corrections (which improves accuracy), and integrity monitoring (which improve safety).

Prior Art FIG. 2 shows a proposed WAAS that includes WAAS satellite 4 that broadcasts GPS integrity and correction data, and a ranging signal that augments GPS. The WAAS ranging signal is GPS-like and may be received by slightly modified GPS receivers. More specifically, the WAAS signal will be at the GPS L1 frequency and will be modulated with a spread spectrum code from the same family as the GPS C/A codes. The code phase and carrier frequency of the signal is controlled so that the WAAS satellite will provide additional range measurements to a GPS user. The WAAS signal will also carry data that contains differential corrections and integrity information for all GPS satellites, as well as for the geostationary WAAS satellite 4.

The ground network shown in FIG. 2 accumulates differential corrections and integrity data at wide area Reference Stations (WRS) 2 that are widely dispersed. WRS 2 process the raw data received from GPS satellites to determine integrity, differential corrections, residual errors, and ionospheric delay information for each monitored satellite. They also develop ephemeris and clock information for the WAAS geostationary satellite 4. All of this data is accumulated at Wide area Master Site (WMS) 3 and is packaged into the WAAS message that is uplinked to the WAAS geostationary satellite 4 that broadcasts the WAAS signal. Aircraft such as aircraft 5 receive signals from GPS satellites such as GPS satellite 1 and receive the WAAS signal that then allows for accurately determining the position of aircraft 5. The WAAS signal does not interfere with GPS signals because the received WAAS signal has approximately the same power as GPS signals, and Code Division Multiple Access (CDAA) is used to share the L1 channel. In addition, position determination devices that use the WAAS do not need an additional antenna and receiver since the GPS antenna and receiver are used to pick up the WAAS signal. However, prior art systems are designed either to receive and process WAAS signals (on the existing L1 receiver of the GPS position determination device), or to receive and process RTCM signals (using a radio receiver operating in the 300 kHz range), or to receive and process correction data in a particular manufacturer's format (typically at a frequency in the unlicensed frequency band). Thus, prior art systems that use a particular manufacturer's format are not RTCM compatible. That is, they cannot use RTCM signals for accurately determining position. In addition, systems that are designed to receive and process WAAS signals are not RTCM compatible (they cannot use RTCM signals for accurately determining position).

In operations that use position determination devices, it is often necessary to use data from other sources in conjunction with locations determined using the position determination device. For example, in surveying operations, it is often necessary to use data from a laser range finder in conjunction with locations determined using a position determination device. Laser range finders and other similar devices (external data devices) typically include a standard communication port. This standard communication port can be used to connect the laser range finder to the position determination system via a standard electrical cable. However, the use of an electrical cable inhibits separate and independent use of the position determination system. That is, the position determination system cannot move any further from the laser range finder than the electrical cable will allow. Also, cables often break. Furthermore, the cables are a nuisance, making handling of components connected by cable difficult and clumsy.

What is needed is a position determination system that is easily moved from place to place, that is easy to use, and can use RTCM correction data when it is available and when it is required for accurately determining position. Also, what is needed is a method and apparatus for coupling correction data from RTCM signals to a position determination device. Also, a method and apparatus for coupling data from external data devices to a position determination device is required that does not require the use of cables. The present invention provides a solution to the above needs.

DISCLOSURE OF THE INVENTION

The present invention provides a method and apparatus for coupling correction data to a position determination device. In addition, the present invention provides a method and apparatus for coupling data from an external data device to a position determination device.

A data transmission device is disclosed that is adapted to couple to a device that generates data (hereinafter referred to as an "external data device"). An external data device is any device that outputs serial data and that includes one or more connection mechanism (e.g. a connector receptacle). Examples of external data devices include, for example, a laser range finder, a moisture meter, a depth sounder, etc.

In one embodiment, the data transmission device, referred to hereinafter as an Auxiliary Data Transfer Unit (ADTU), couples to an external data device via cable. The ADTU receives serial data from the external data device. The serial data is then converted to a format suitable for transmission to a position determination device and is transmitted via radio to the position determination device.

The use of an ADTU allows for coupling data from a variety of sources to a position determination device. Since there is no need to configure each external data device such that it communicates with a position determination device, a wide variety of external data devices may be used. Also, significant cost savings are realized. Thus, the present invention provides an inexpensive method and apparatus for coupling a wide variety of external data devices to a position determination device.

A signal conversion device is also disclosed. The signal conversion device is adapted to couple RTCM correction data to a position determination device. The signal conversion device and the ADTU are designed to operate on the same frequency.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention.

Figure 1:
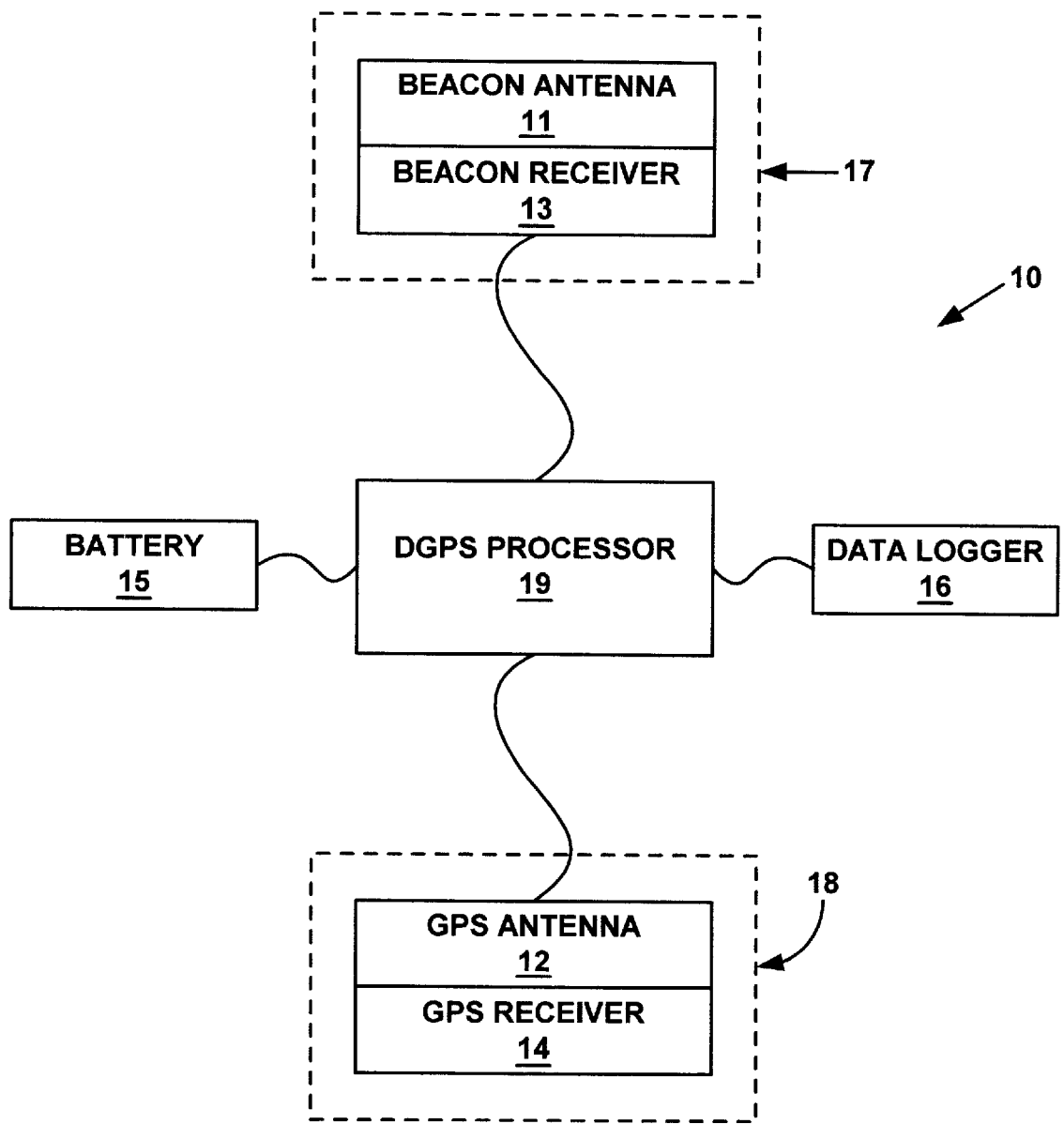
FIG. 1 (Prior Art) is a schematic diagram of the components of a prior art position determination system.
Figure 2:
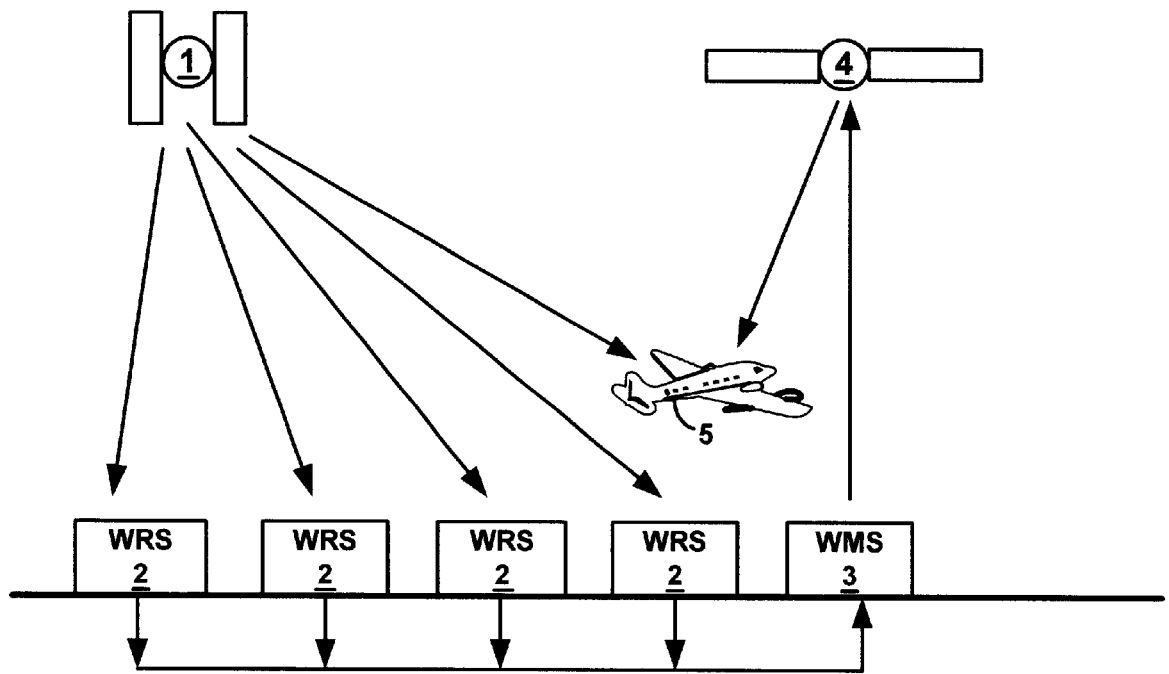
FIG. 2 (Prior Art) is a diagram of a prior art aircraft that is using satellites of the GPS and WAAS signals to determine position.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations of data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating," "incorporating," "calculating," "determining," "communicating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system's memories or registers or other such information storage, transmission, or display devices. Thus, the present invention is also well suited to the use of general purpose computer systems and other computer systems such as, for example, optical and mechanical computers.

Figure 3:
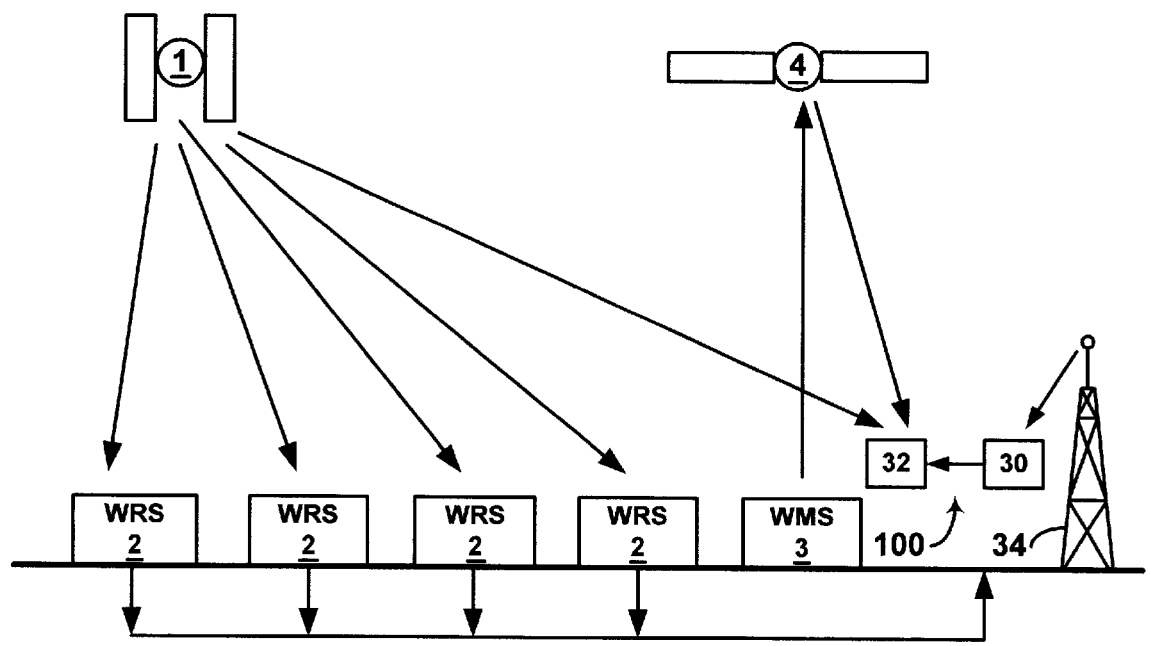
FIG. 3 is a position determination system that uses RTCM signals, signals from GPS satellites, and signals from WAAS satellites to determine position in accordance with the present claimed invention.

Referring now to FIG. 3, a position determination system 100 that includes signal conversion device 30 and position determination device 32 is shown. Stations that transmit RTCM signals transmit within a frequency band of 283.5 to 325 kHz. Each RTCM transmission station typically transmits at its own frequency within this frequency band. Signal conversion device 30 receives RTCM signals from RTCM transmission stations such as RTCM transmission station 34.

Signal conversion device 30 demodulates the RTCM signals so as to obtain RTCM correction data. The RTCM correction data is then converted to a frequency adapted to be received by a position determination device and is retransmitted. The signal transmitted by signal conversion device 30 is received by position determination device 32 that uses the RTCM correction data to accurately determine position.

Continuing with FIG. 3, position determination device 32 may use any number of different sources of position determination data in order to calculate position. With any example illustrated in FIG. 3, position determination device 32 uses data from GPS satellite 1 (along with data from other GPS satellites that are not shown) to determine position. In addition, position determination device 32 may use correction data transmitted in the WAAS signal for determining position.

Figure 4:
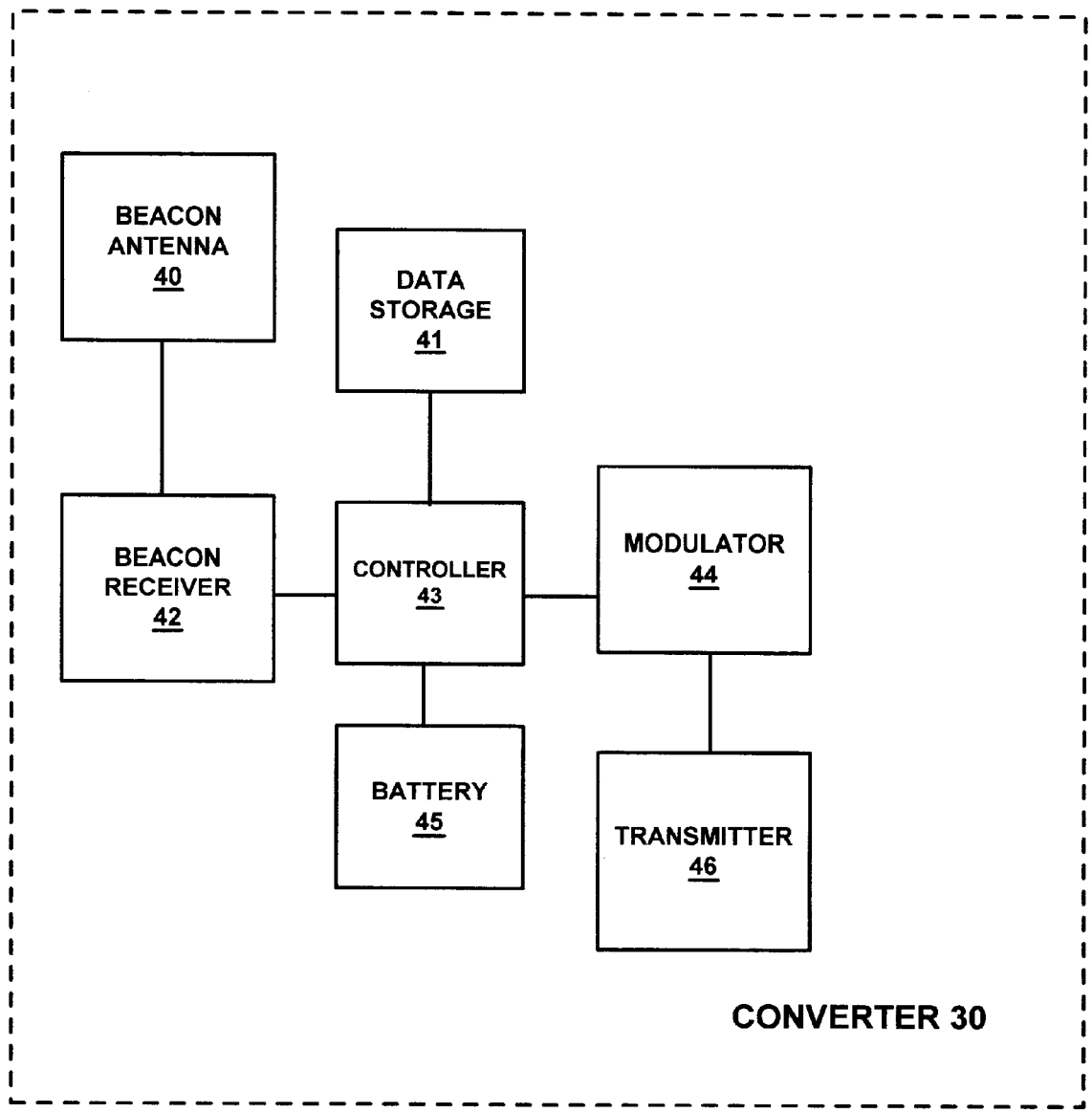
FIG. 4 is a schematic diagram illustrating a converter in accordance with the present claimed invention.

FIG. 4 shows converter 30 to include beacon antenna 40 that is coupled to beacon receiver 42. In one embodiment, beacon antenna 40 is formed of crossed ferrite rods. However, any number of different types of antennas could be used for receiving RTCM signals. Converter 30 also includes controller 43 that controls the operations of converter 30. Battery 45 provides power to the other components of converter 30. Data storage 41 stores data as required for the operation of converter 30. In one embodiment, data storage 41 is a random access memory device; however, any number of other types of memory devices such as, for example, flash memory devices can be used. Also coupled to controller 43 is modulator 44 that couples to transmitter 46.

Figure 5:
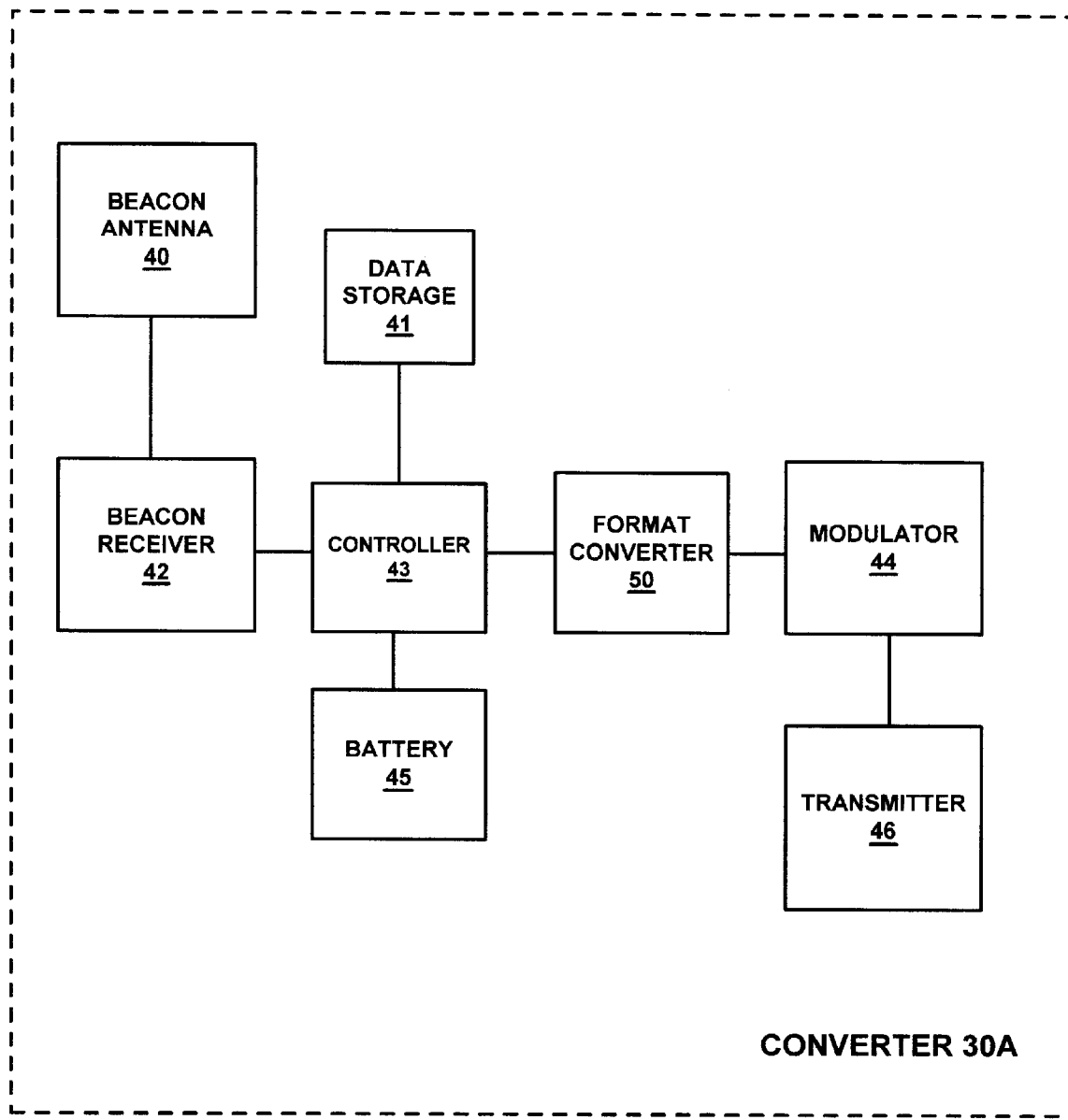
FIG. 5 is a schematic diagram illustrating a converter that includes format conversion capabilities in accordance with the present claimed invention.
Figure 6:
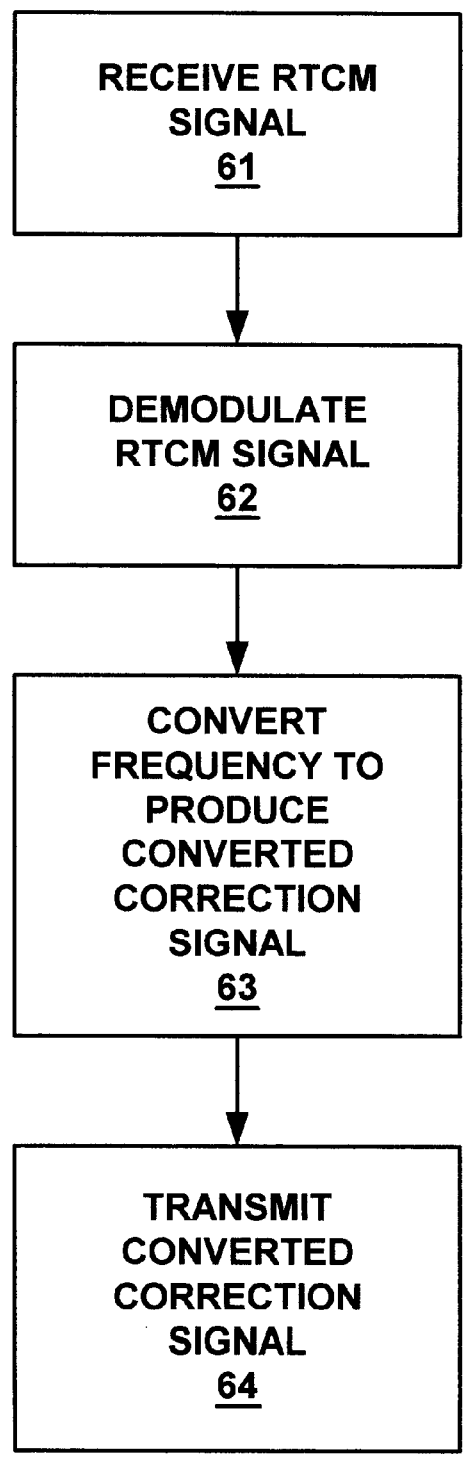
FIG. 6 is a flow chart illustrating a method of converting RTCM signals into a frequency adapted to be received by a position determination device in accordance with the present claimed invention.

FIG. 5 shows an embodiment in which the converter, shown as converter 30A, includes format converter 50. Format converter 50 is shown to be coupled to controller 43 and to modulator 44. Format converter 50 operates in conjunction with controller 43 and data storage 41 for converting data that is received in the RTCM transmission format into a different format. In one embodiment, format converter 50 converts RTCM correction data into a WAAS format. Alternatively, format converter 50 may convert the RTCM correction data into a particular manufacturer's format. With reference next to FIG. 6, a flow chart illustrating a method of providing RTCM correction data to position determination device is shown. As shown by step 61, RTCM signals are received by the converter. In the embodiments shown in FIGS. 4–5, RTCM signals are received by beacon antenna 40 and are coupled to beacon receiver 42. Next, the RTCM signals are demodulated as shown by step 62. In the embodiments shown in FIGS. 4–5, beacon receiver 42 demodulates the RTCM signals so as to obtain RTCM correction data that is then coupled to modulator 44.

Continuing with FIG. 6, the RTCM correction data is converted to a different frequency as shown by step 63. In the embodiment shown in FIGS. 4–5, modulator 44 modulates the RTCM correction data to the desired frequency so as to produce a converted correction signal. The converted correction signal is then transmitted as shown by step 64. In the embodiment shown in FIGS. 4–5, the converted correction signal is transmitted by transmitter 46. In one embodiment, the converted correction signal is modulated to a radio frequency that does not require a license (an unlicensed frequency). However, any desired frequency available for this type of service could be used. In one embodiment a frequency of 2.4 GHz is used. In an alternate embodiment, a frequency of 918 MHz is used.

In an alternate embodiment, the RTCM correction data is converted into a different transmission format such that it may be readily received by a position determination device.

Figure 7:
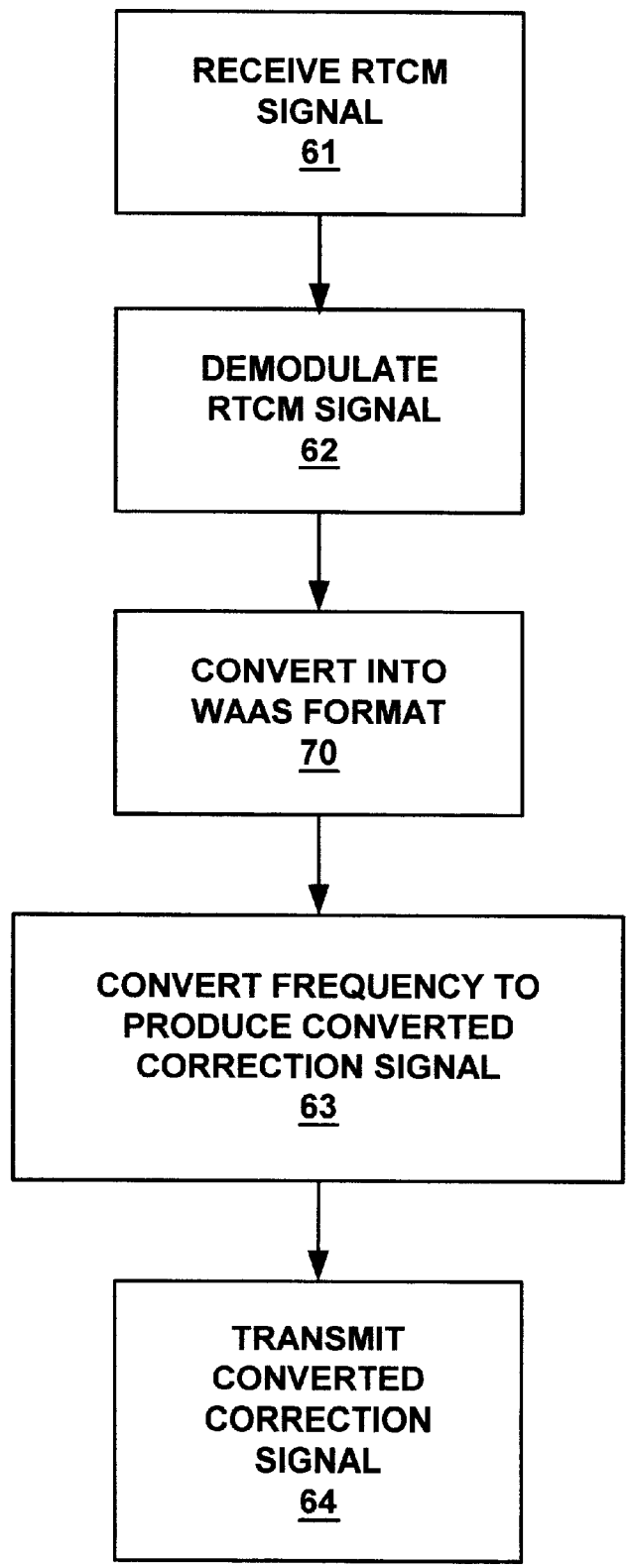
FIG. 7 is a flow chart showing a method of converting RTCM signals into a WAAS format and into a frequency adapted to be received by a position determination device in accordance with the present claimed invention.

Referring now to FIG. 7, RTCM signals received in step 61 are demodulated, as illustrated by step 62, so as to yield RTCM correction data. The RTCM correction data is then converted into the desired format.

Figure 8:
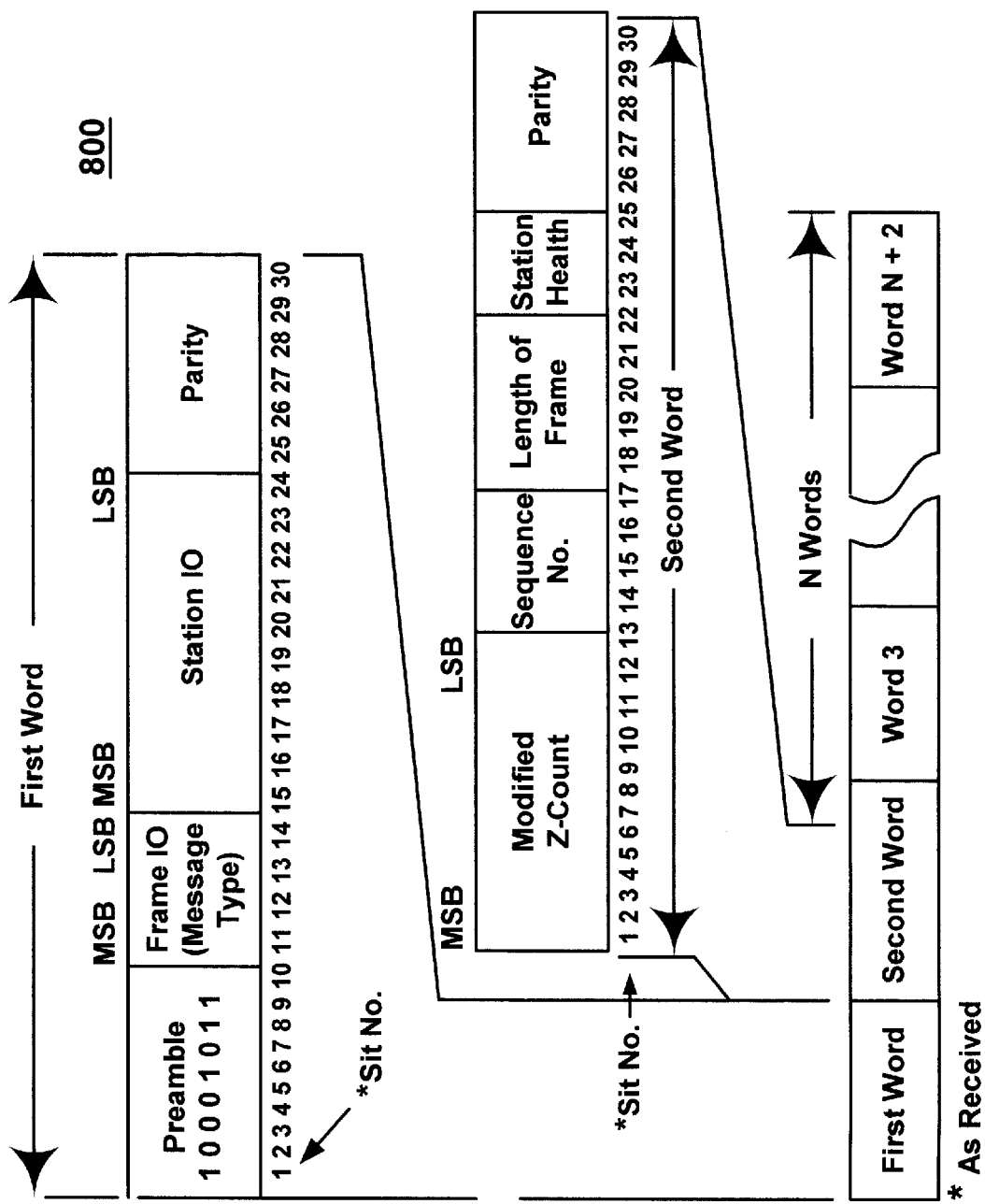
FIG. 8 shows the basic RTCM data format of the first two words of a RTCM message.

In the embodiment shown in FIG. 7, RTCM correction data is converted from the RTCM format into the WAAS format. Referring now to FIG. 8, the basic format for the first two words of an RTCM message is shown. Each RTCM message frame is made up of several 30 bit words, always headed by two standard words that are shown in FIG. 8. The first word provides the following, as shown: an 8 bit fixed preamble; a 4 bit message identifier; a 12 bit station identifier; and 6 parity bits. The second word provides the following: 16 bits of timing data (modified z count and sequence number); 5 bit message frame length; 3 bit station health information; and 6 parity bits. The number of following words in an RTCM message can vary from zero to 31 depending on the message type and the number of GPS satellites in view of the RTCM ground reference station.

Figure 9:
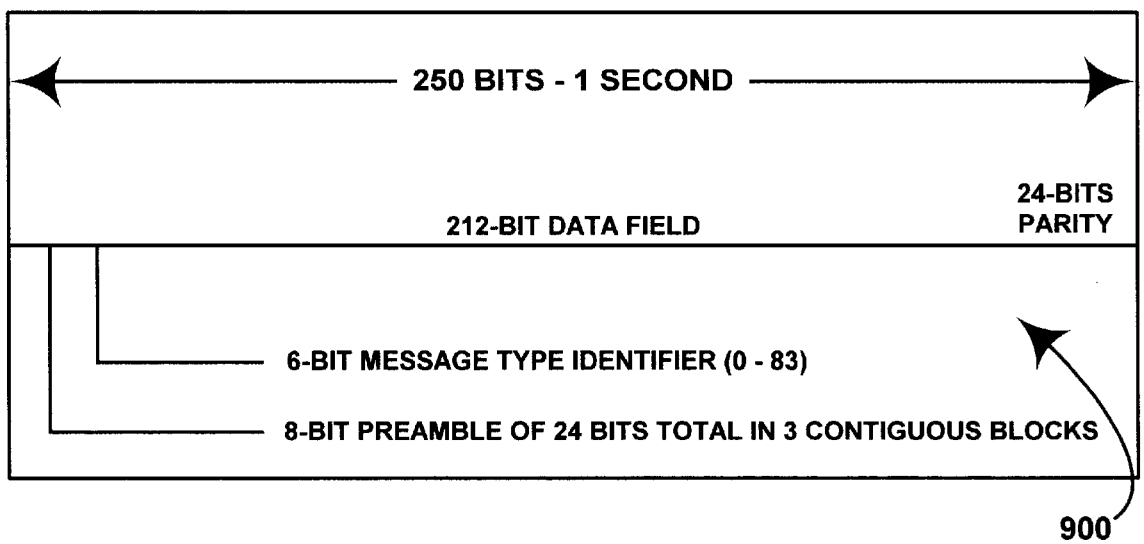
FIG. 9 shows the basic WAAS data format.

Referring back to FIG. 7, in step 70, the received RTCM correction data is converted into a WAAS format. In so doing, all of the information contained in the RTCM message is retained and converted into the WAAS format. Referring now to FIG. 9, the basic WAAS data format is shown. In general, the WAAS message format and overall system specifications are determined by the FAA and are well known in the GPS products industry. The WAAS message 900 contains separate corrections for each GPS satellite. The WAAS messages also carry estimates of the distortions caused by the earth's ionosphere for a "grid" of locations across North America. The WAAS message is broadcast at a data rate of approximately 250 bits per second, and a WAAS message stream carries corrections for all 24 GPS satellites. The basic WAAS message is 250 bits in length. Each WAAS message block comprises the following, as shown: an 8 bit preamble; a 6 bit message type; a 212 bit data field; and a 24 bit cyclic redundancy check parity. The 8 bit preamble is actually a 24 bit preamble distributed across 3 successive message blocks. The message type field is 6 bits long, which allows for 64 different messages.

Still referring to FIG. 9, each basic WAAS message shares the basic format shown in FIG. 9. As previously discussed, a WAAS message includes correction data for all 24 GPS satellites. A typical RTCM message only includes correction data relating to satellites observed by the RTCM reference station at any particular time. Thus, the translated correction message will only contain data relating to those satellites observed by the RTCM reference station.

Referring back to FIG. 7, after the RTCM correction data is translated into the WAAS format, as shown by step 63, the frequency is converted to produce a converted correction signal that is then transmitted as shown by step 64. In one embodiment, the transmission is in the very high frequency (VHF) range and is at a frequency that is in the unlicensed frequency band. In one specific embodiment, the transmission is at a frequency of 2.4 GHz. In an alternate embodiment, a frequency of 918 MHz is used.

Alternatively, the WAAS formatted message is modulated as required by the WAAS transmission format (a CDMA modulated signal that is modulated to the L1 frequency). The signal is then transmitted on the L1 frequency. In an embodiment where the converted correction signal is transmitted on the L1 frequency, there is no need for a separate beacon antenna and beacon receiver in the position determination device. This results in a less expensive position determination device and position determination system.

In one embodiment, the signal includes a layer of error correction data. This layer of correction data is added on top of the RTCM signals. The content and format is dependent on the nature and extent of correction data available in a particular area or application. However, in one embodiment, an error correction protocol conforming to the MNP10 standard is used. However, other well known protocols may also be used.

Figure 10:
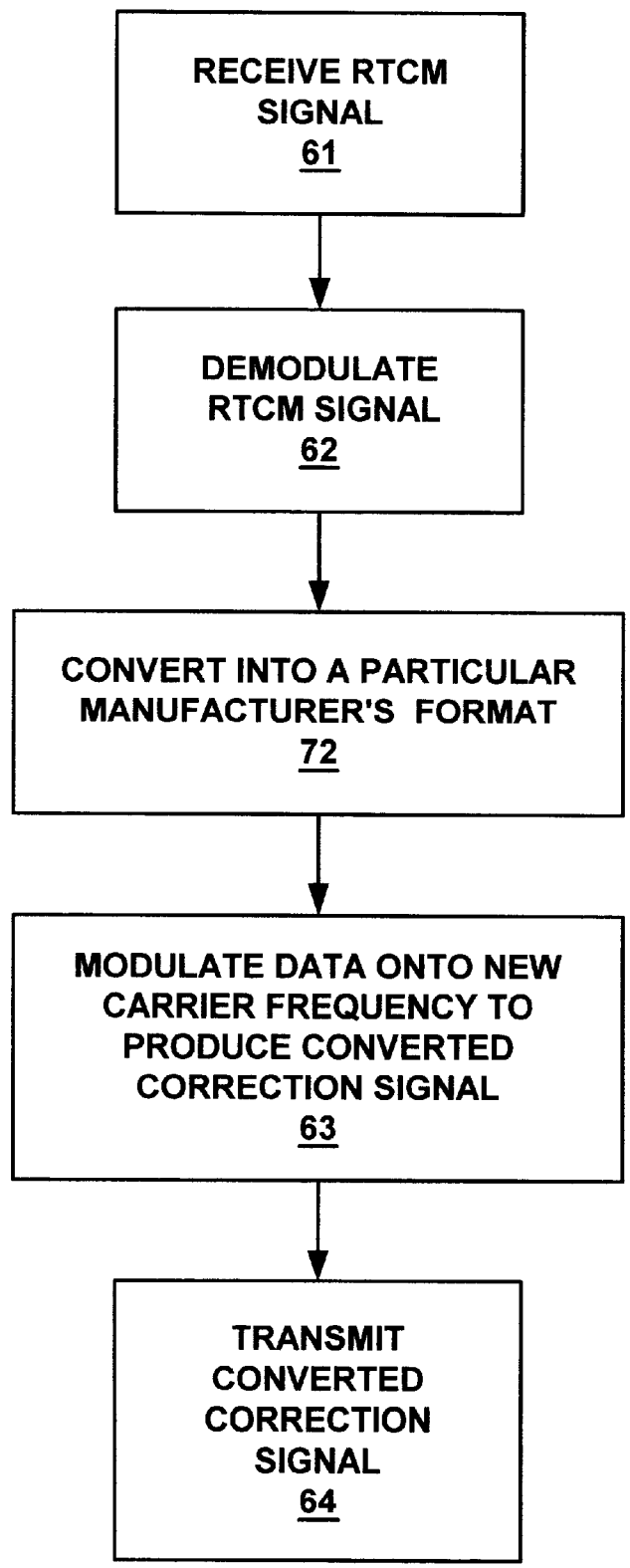
FIG. 10 is a flow chart showing a method of converting RTCM signals into a particular manufacturer's format and into a frequency adapted to be received by a position determination device in accordance with the present claimed invention.

In the embodiment shown in FIG. 10, data is converted into the particular manufacturer's format. In this embodiment, RTCM signals are received as shown by step 61 and are demodulated as shown by step 62 so as to obtain RTCM correction data. The RTCM correction data is converted into a particular manufacturer's format as shown by step 72. The correction data is then modulated to a frequency adapted to be received by a position determination device as shown by step 63 so as to produce a converted correction signal. The converted correction signal is then transmitted as shown by step 64.

Figure 11:
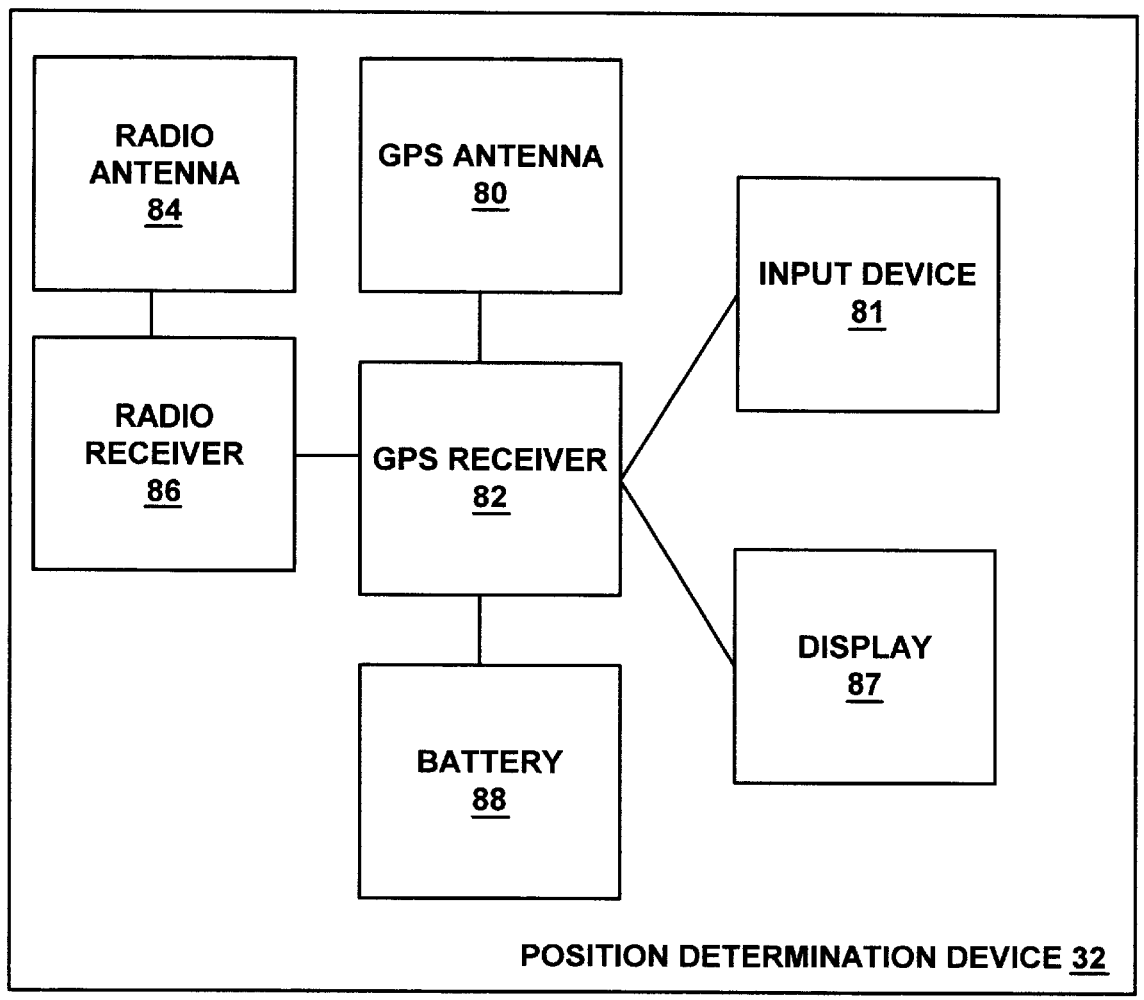
FIG. 11 is a schematic diagram showing a position determination device that includes a radio antenna and receiver adapted to receive correction data in accordance with the present claimed invention.

FIG. 11 shows position determination device 32 to include radio antenna 84 that is coupled to radio receiver 86. Position determination device 32 also includes a GPS antenna 80 that is coupled to GPS receiver 82. Battery 88 provides power to the position determination device 32. Display 87 is also coupled to GPS receiver 82. Display 87 may be any of a number of different types of display devices such as, for example, a Liquid Crystal Display (LCD), a thin Cathode Ray Tube, or other display device suitable for creating graphic images and alphanumeric characters recognizable to the user. Input device 81 allows user to input data into position determination device 32. In one embodiment, input device 81 is a alphanumeric keypad that includes a number of function keys that operates in conjunction with display 87 so as to allow user to input data.

Referring still to FIG. 11, in operation, position determination data is received from satellites of the GPS by GPS antenna 80. The position determination data is coupled to GPS receiver 82 for determining position. Converted correction signals are received by radio antenna 84 and are coupled to radio receiver 86. Radio receiver 86 demodulates the converted correction signals to obtain RTCM correction data that is coupled to GPS receiver 82. The RTCM correction data is then used in conjunction with the received position determination data to more accurately determine position.

In one embodiment, both RTCM correction data and received WAAS correction data is used to calculate position. In one embodiment, this is done by switching back and forth automatically between RTCM correction data and WAAS correction data.

Figure 12:
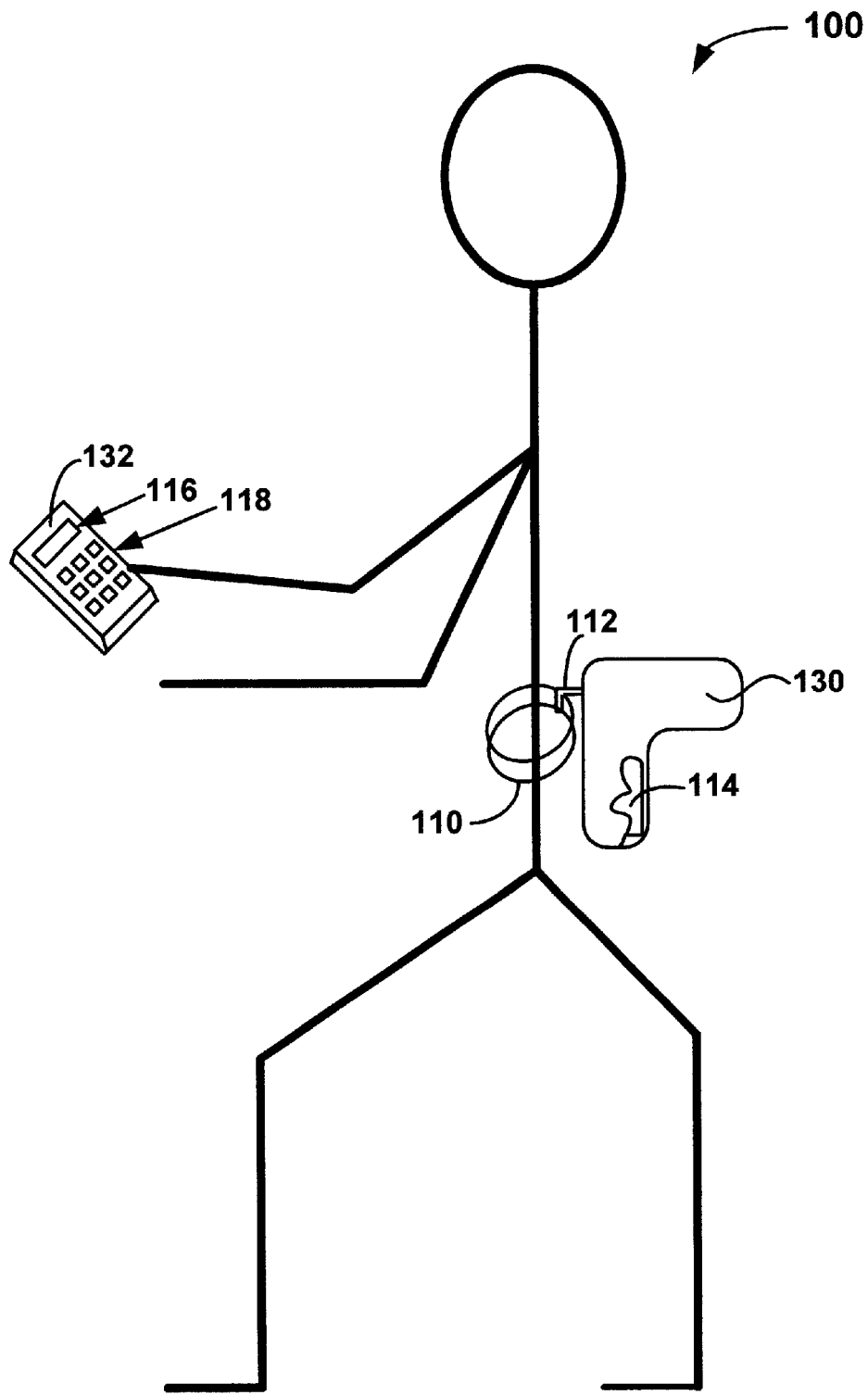
FIG. 12 shows a side view of a specific implementation in which the converter is adapted to fit onto a user's belt and in which the position determination device is a handheld unit in accordance with the present claimed invention.

FIG. 12 shows a specific implementation in which position determination system 100 includes a converter 130 that fits on a user's belt and a position determination device 132 that is small enough to fit in a user's hand. In one embodiment, position determination device 132 includes a display 116 and function keys 118. In this embodiment, converter 130 is roughly L-shaped with horizontal and vertical segments. The beacon antenna and some of the other electronic components are positioned in the horizontal segment, and the remaining electronic components and the batteries 114 are located in the vertical segment. A belt clip 112 attaches to the housing of converter 130 for coupling converter 130 to a belt such as belt 110.

Figure 13:
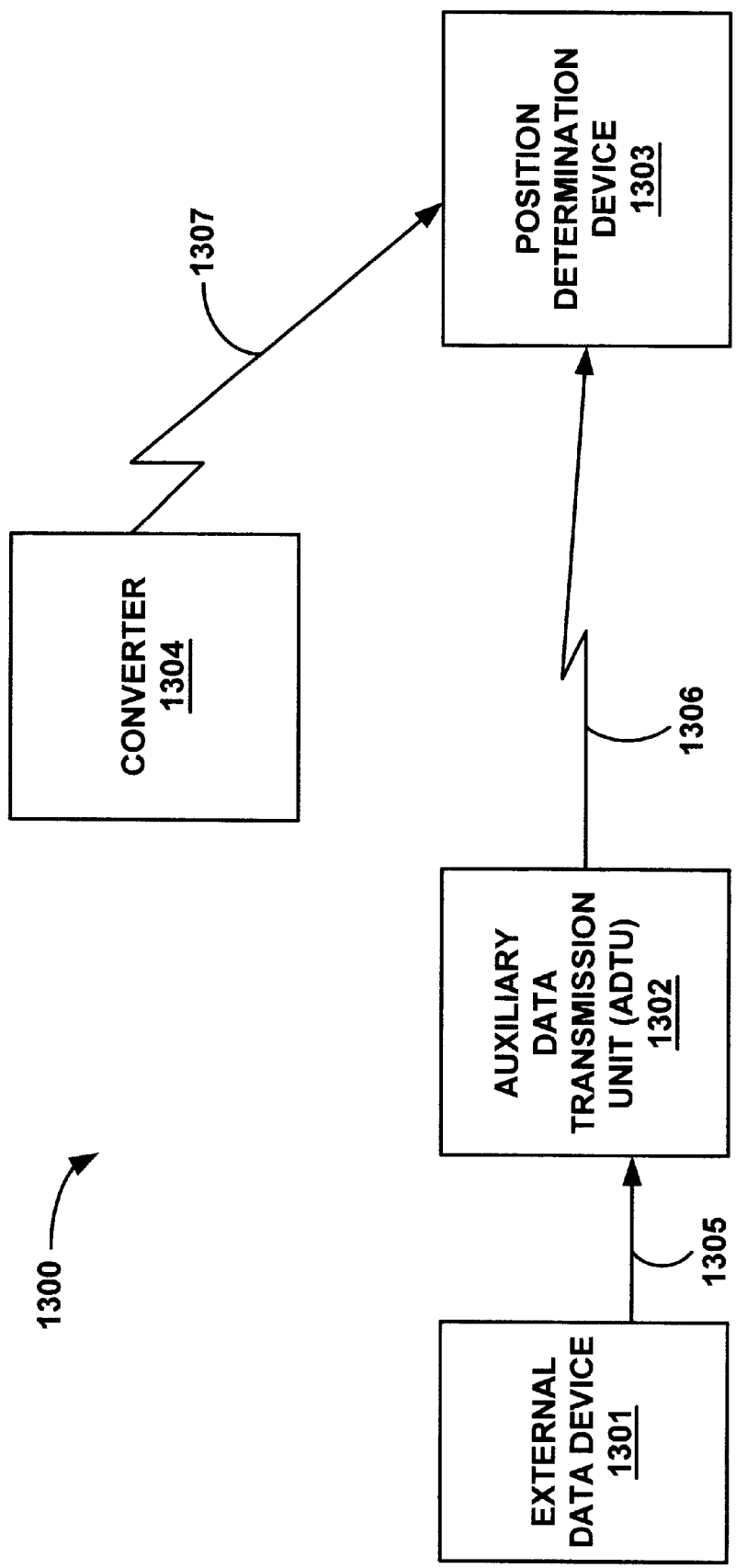
FIG. 13 shows a schematic diagram of a system that includes an ADTU that is coupled to an external data device for transmitting data to a position determination device in accordance with the present claimed invention.

FIGS. 13–17 show an embodiment that includes an auxiliary data transmission Unit (ADTU) that is adapted to couple data from an external data device. Referring now to FIG. 13, position determination system 1300 is shown to include external data device 1301 that is coupled to ADTU 1302. External data device 1301 is a device that outputs serial data such as, for example, a laser range finder, a depth sounder, a moisture meter, etc. Position determination system 1300 also includes converter 1304 that is adapted to couple RTCM correction data (arrow 1307) to position determination device 1303. In one embodiment, converter 1304 is identical to converter 30 of FIGS. 4 or converter 30a of FIG. 5, and position determination device 1303 is identical to position determination device 32 of FIG. 11. Alternatively, converter 1304 and position determination device 1303 may include more or fewer features, and may be specifically adapted to operate in conjunction with ADTU 1302.

Continuing with FIG. 13, ADTU 1302 is adapted to couple to external data device 1301 so as to receive serial data from external data device 1301 as shown by arrow 1305. This data is then coupled to position determination device 1303 as shown by arrow 1306.

Figure 14:
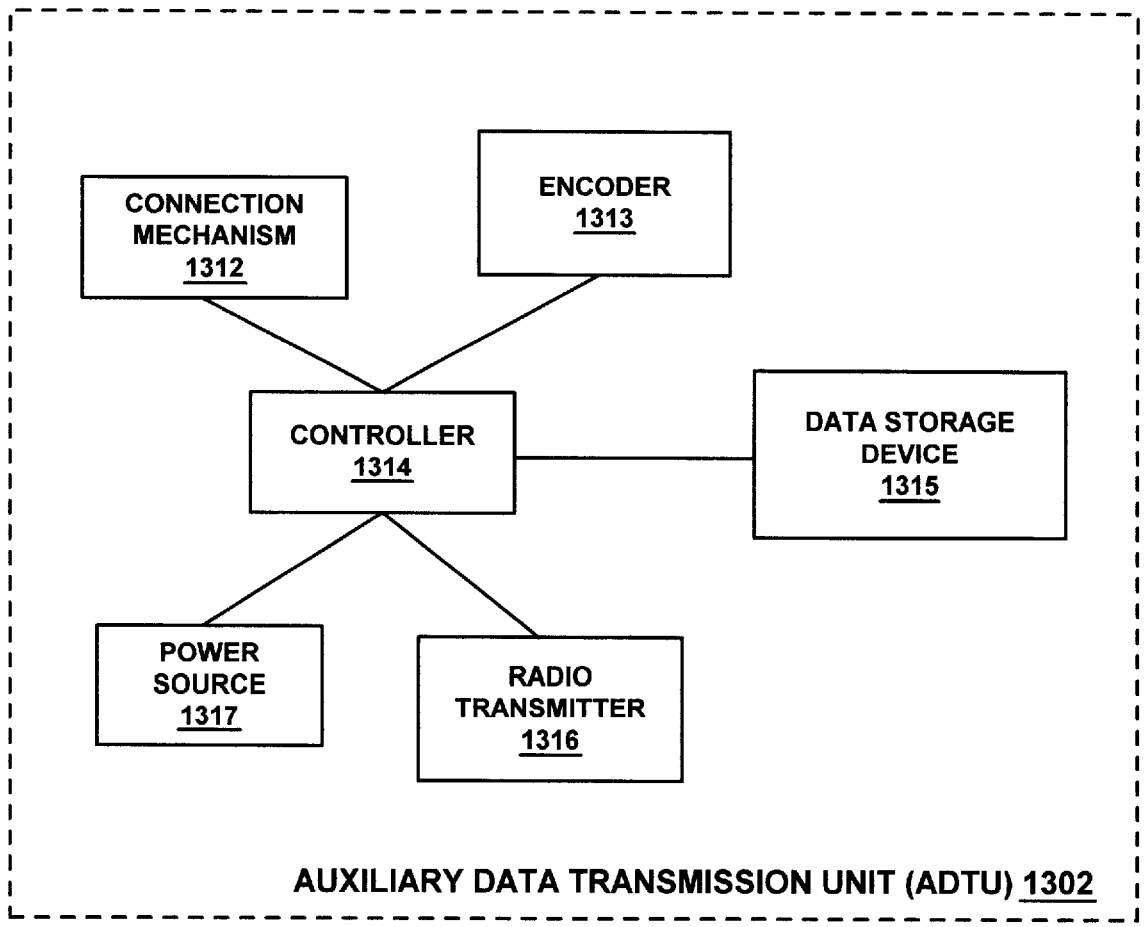
FIG. 14 shows a diagram of an ADTU in accordance with the present claimed invention.

FIG. 14 shows an ADTU 1302 that includes a connection mechanism 1312. Connection mechanism 1312 is adapted to connect to an external data device such as external data device 1301 of FIG. 13. In one embodiment, connection mechanism 1312 is a connector that complies with the RS-232 standard.

ADTU 1302 of FIG. 14 includes controller 1314 for controlling the operations of ADTU 1302. In one embodiment, controller 1314 is a general-purpose microprocessor that has low power consumption such as, for example, a MIPS R4K microprocessor made by Silicon Graphics Inc., of Mountain View, Calif. In one embodiment, a computer program (not shown) operates on controller 1314 for controlling the operations of ADTU 1302. Alternatively, controller 1314 can be an Application Specific Integrated Circuit (ASIC) device or a Field Programmable Gate Array (FPGA) device that is programmed to perform the desired functions.

Continuing with FIG. 14, power source 1317 provides power to the various components of ADTU 1302. Power source 1317 may be any suitable power source that is light-weight and compact such as, for example, AA or AAA batteries.

Data storage device 1315 is coupled to controller 1314 and is adapted to store data. Data that can be stored in data storage device 1314 includes, for example, an operating software program and/or a software program that performs the functions of encoder 1313 of FIG. 14 (e.g., a data encoding algorithm). Data storage device 1315 may be any type of digital data storage medium. In one embodiment, data storage device 1315 is a Random Access Memory (RAM) device such as, for example, a Static Random Access Memory (SRAM) device, a Dynamic Random Access Memory (DRAM) device or a flash memory storage device.

Referring still to FIG. 14, in one embodiment, ADTU 1302 includes a radio transmitter 1316 that transmits and receives data over an unlicensed radio frequency. However, licensed frequency bands could also be used. Data may be transmitted using any of a number of different transmission methods and formats and may be single-channel or multi-channel.

Referring again to FIG. 14, encoder 1313 is operable to encode data into a format suitable for reception by a position determination device. In one embodiment encoder 1313 is an algorithm that is performed by controller 1314. Alternatively, encoder 1313 can be a software program that is adapted to run on controller 1314.

Figure 15:
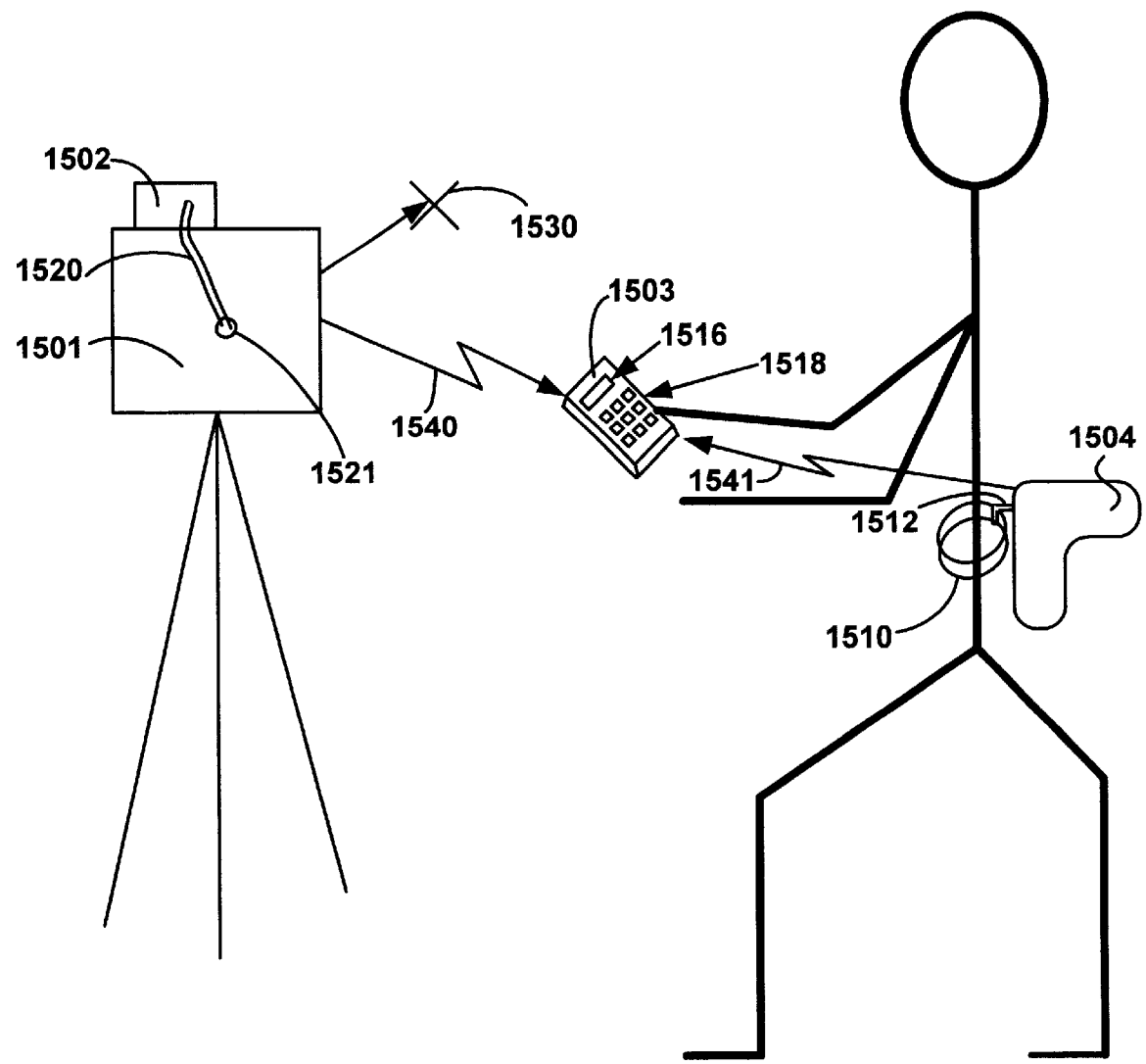
FIG. 15 shows a side view of a specific implementation that includes a laser range finder, an ADTU, a converter that is adapted to fit onto a user's belt and a position determination device that is a handheld unit in accordance with the present claimed invention.

Referring now to FIG. 15, a specific implementation of the present invention is shown that includes position determination device 1503, converter 1504 and ADTU 1502. The external data device is a laser range finder 1501. In this embodiment, position determination device 1503 is small enough to fit into a user's hand and includes display 1516 and function keys 1518.

Continuing with FIG. 15, converter 1504 includes a belt clip 1512 that is adapted to attach to a user's belt, shown generally as belt 1510.

Still referring to FIG. 15, laser range finder 1501 is coupled to ADTU 1502 by a connection mechanism that includes electrical cable 1520 and connector 1521. Connector 1521 conforms to the RS-232 standard and couples to a corresponding connector receptacle in laser range finder 1501. Laser range finder 1501 is adapted to determine distance to targets such as target 1530.

Figure 16:
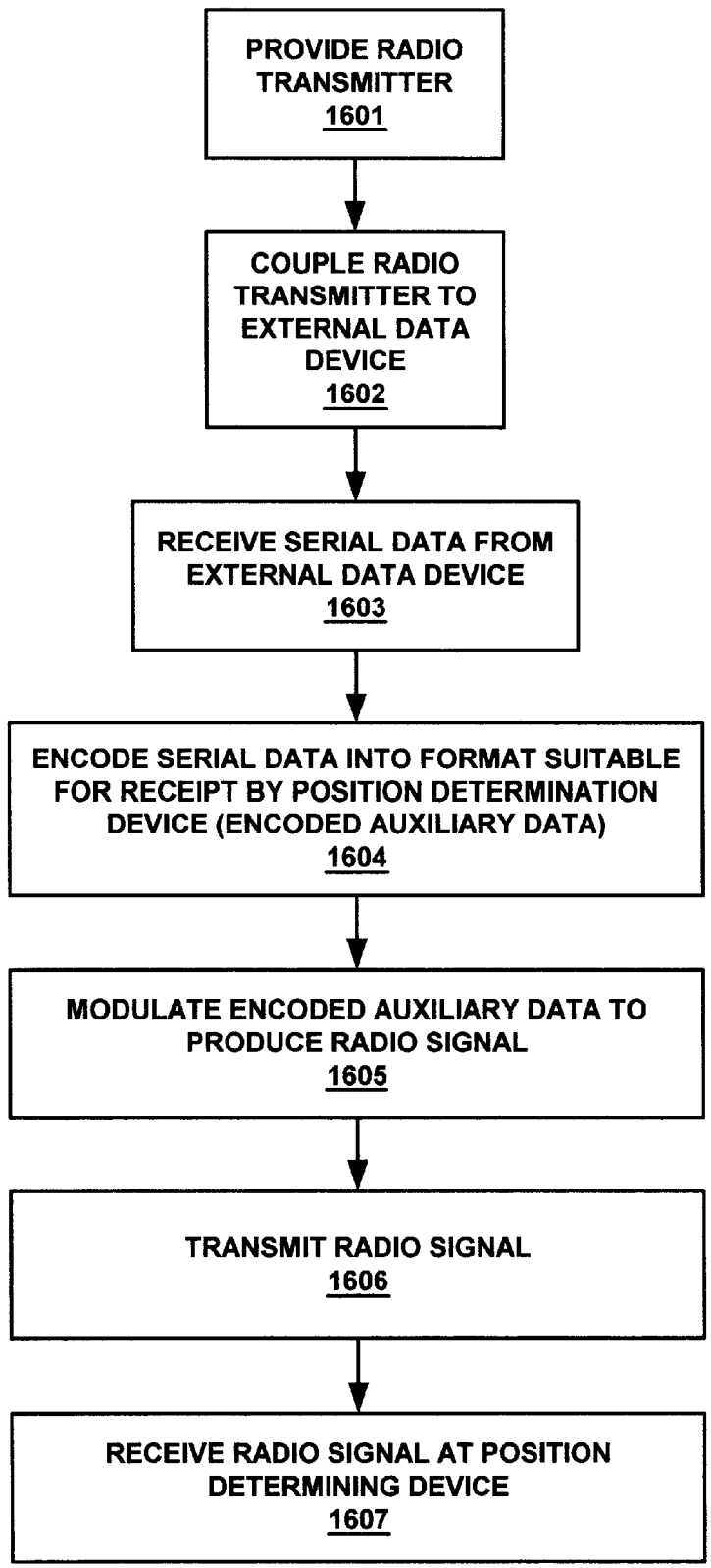
FIG. 16 is a flow chart showing a method for coupling data to a position determination device in accordance with the present invention.

Referring now to FIG. 16, a method for coupling data to a position determination device is shown. First, as shown by step 1601, a radio transmitter is provided. In the embodiments shown in FIG. 14, auxiliary data transmission unit 1302 is provided that includes a radio transmitter 1316. In the embodiment shown in FIG. 15, ADTU 1502 is provided that includes a radio transmitter.

The ADTU (that includes a radio transmitter) is then coupled to an external data device as shown by step 1602. In one embodiment, the external data device is a laser range finder such as laser range finder 1501 of FIG. 15. Alternatively, the external data device may be any device that outputs serial data. In one embodiment, a connector that couples to the ADTU via cable is used to couple the ADTU to the external data device (e.g., cable 1520 and connector 1521 of FIG. 5). Alternatively, any of a number of other known methods for electrically coupling the external data device can be used.

Continuing with FIG. 16, serial data is received at the ADTU from the external data device as shown by step 1603. In the embodiment shown in FIGS. 13–14, serial data output by external data device 1301 is coupled, as shown by line 1305 to ADTU 1302. In the embodiment shown in FIG. 15, serial data output by laser range finder 1501 is coupled to ADTU 1502 through connector 1521 and electrical cable 1520.

Referring still to FIG. 16, as shown by step 1604, the serial data is then encoded as shown by step 1604 to obtain encoded data. That is, the serial data is changed into a format suitable for receipt by a position determining device. In one embodiment, the received serial data is encoded by converting the serial data into 12-bit words that include forward error correction bits. When the received serial data is formatted in 8-bit words, the data encoding step converts each 8-bit word into a 12 bit word by adding forward error correction bits.

As shown by step 1605 of FIG. 16, the encoded data is then modulated so as to produce a radio signal. In the embodiment shown in FIG. 14, radio transmitter 1316 modulates the encoded data to a radio frequency in the unlicensed frequency band. In one embodiment, a frequency of 916 megaHertz is used. Alternatively, a frequency of 868 megaHertz, or a frequency of 2.4 gigaHertz is used. Any of a number of different frequencies, either in the unlicensed frequency band or the licensed frequency band could also be used. The radio signal generated by step 1605 is transmitted as shown by step 1606.

Radio signals transmitted in step 1606 are then received by a position determination device as shown by step 1607. In the embodiment shown in FIG. 13, arrow 1306 illustrates radio signals coupled from ADTU 1302 to position determination device 1303. Arrow 1540 of FIG. 15 shows radio signals coupled from ADTU 1502 to position determination device 1503.

As discussed in FIGS. 1–12, radio signals are also coupled from the converter to the position determination device. In the embodiment shown in FIG. 13, converter 1304 transmits radio signals (arrow 1307) which are received by position determination device 1303. In the embodiment shown in FIG. 15, radio signals from converter 1504 are transmitted to position determination device 1503 as shown by arrow 1541.

Figure 17:
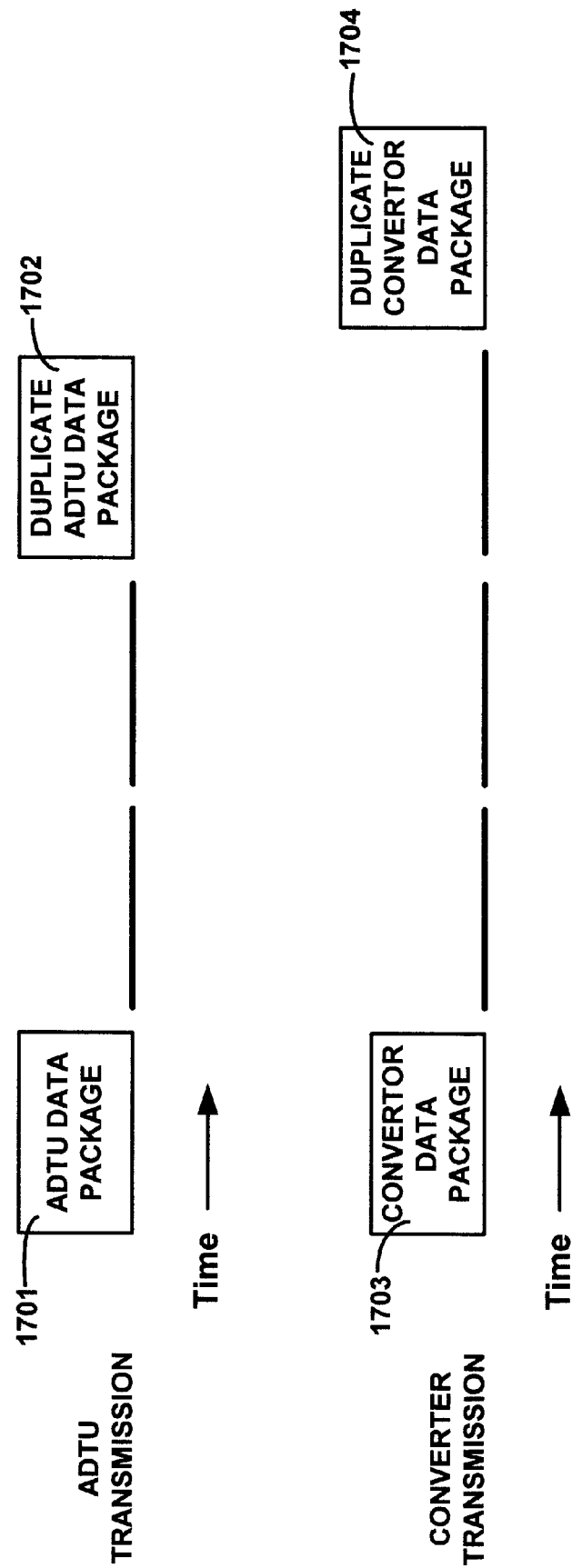
FIG. 17 is a diagram showing a signal transmitted by an ADTU and a signal transmitted by a converter in accordance with the present invention.

When transmissions from the ADTU and the converter are modulated to a common frequency, a method for preventing data loss from signal interference is used. In one embodiment, Time Division Multiple Access (TDMA) methods are used to prevent data loss from signal interference. Other methods may also be used to prevent data loss from signal interference. Referring now to FIG. 17, a data transmission method is used that generates a duplicate data packet. The duplicate data packet and the original data packet are transmitted at different time intervals to prevent data loss from signal interference.

FIG. 17 shows an exemplary data transmission method in which data is formatted into data packages having a ¹⁄₁₀ second transmission time. Each data package is then duplicated. A first data package, generated by an ADTU is shown as ADTU data package 1701. ADTU data package 1701 is duplicated so as to produce duplicate ADTU data package 1702. Similarly, the converter transmits a converter data package 1703 and a duplicate converter data package 1704. Transmission of ADTU data package 1701 and duplicate ADTU data package 1702 are spaced apart by two time intervals while transmission of converter data package 1703 and duplicate converter data package 1704 are spaced apart by three time intervals. This prevents data loss because, even when transmission of ADTU data package 1701 and converter data package 1703 interfere with each other, duplicate ADTU data package 1702 and duplicate converter data package 1704 are received.

The present invention provides for easily coupling data from an external data device to a position determination device. By using an ADTU that can be attached to any external data device that transmits serial data, a flexible and cost effective network of equipment is easily obtained. As required for a particular application, external data devices are coupled to an ADTU. Once all necessary data is obtained from a particular external data device, another external data device may then be used by detaching the ADTU from the first external data device and coupling it to the second external data device. In this way, many different external data devices may be used without the need to permanently couple a transmitter to each external data device. This results in significant cost savings and a network that is easily configurable to meet the needs of a particular project.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A data transmission device comprising:
   a.) a controller adapted to control the operation of said data transmission device;
   b.) a data storage device coupled to said controller and adapted to store data;
   c.) a connection mechanism coupled to said controller and adapted to couple to an external data device for receiving serial data;
   d.) an encoder for encoding serial data into encoded data, said encoded data having a format adapted to be received by a position determination device, said encoder including a signal interference algorithm for preventing data loss from signal interference;
   e.) a radio transmitter coupled to said controller for transmitting said data from said encoded data to a position determination device; and
   f.) a housing, said controller, said data storage device, said encoder, and said radio transmitter disposed in said housing.

2. The data transmission device of claim 1 wherein said connection mechanism includes a connector that conforms to the RS232 standard.

3. A data transmission device comprising:
   a.) a controller adapted to control the operation of said data transmission device;
   b.) a data storage device coupled to said controller and adapted to store data;
   c.) a connection mechanism coupled to said controller and adapted to couple to an external data device for receiving serial data;
   d.) an encoder for encoding serial data into encoded data, said encoded data having a format adapted to be received by a position determination device, said encoder is an algorithm for converting 8-bit data words into 12-bit data words that include forward error correction bits;
   e.) a radio transmitter coupled to said controller for transmitting said encoded data to a position determination device; and
   f.) a housing, said controller, said data storage device, said encoder, and said radio transmitter disposed in said housing.

4. The data transmission device of claim 1 wherein said signal interference algorithm generates duplicate data that is transmitted at predetermined intervals for preventing data loss from signal interference.

5. A method for coupling data from an external data device to a position determination device comprising:
   a.) providing a radio transmitter adapted to couple to an external data device;
   b.) coupling said radio transmitter to an external data device;
   c.) receiving serial data from said external data device;
   d.) encoding said serial data so as to obtain encoded data, said encoded data formatted using Time Division Multiple Access (TDMA) formatting methods to prevent data loss from signal interference;
   e.) modulating said encoded data so as to produce a radio signal; and
   f.) transmitting said radio signal to a position determination device.

6. A method for coupling data from an external data device to a position determination device comprising:
   a.) providing a radio transmitter adapted to couple to an external data device;
   b.) coupling said radio transmitter to an external data device;
   c.) receiving serial data from said external data device;
   d.) encoding said serial data so as to obtain encoded data that is formatted into a format that includes a data packet and a duplicate data packet, said data packet and said duplicate data packet transmitted at different time intervals to prevent data loss from signal interference;
   e.) modulating said encoded data so as to produce a radio signal; and
   f.) transmitting said radio signal to a position determination device.

7. The method for coupling data from an external data device of claim 6 wherein step d.) further comprises:
   encoding said serial data so as to convert said serial data into 12-bit words, said 12-bit words including forward error correction bits.

8. The method for coupling data from an external data device of claim 6 wherein step e.) further comprises:
   e1.) modulating said encoded data to a frequency of 916 megaHertz so as to produce a radio signal.

9. The method for coupling data from an external data device of claim 6 wherein step e.) further comprises:
   e1.) modulating said encoded data to a frequency of 868 megaHertz so as to produce a radio signal.

10. The method for coupling data from an external data device of claim 6 wherein step e.) further comprises:
    e1.) modulating said encoded data to a frequency of 2.4 gigaHertz so as to produce a radio signal.

11. A network for determining position and receiving data from an external data device comprising:
    a.) a signal conversion device including an antenna adapted to receive RTCM signals that include RTCM correction data, said signal conversion device including a radio receiver coupled to said antenna for demodulating said RTCM signals so as to obtain RTCM correction data, a modulator coupled to said radio receiver for modulating said RTCM correction data into a frequency adapted to be received by a position determination device so as to produce a converted correction signal, and a transmitter for transmitting said converted correction signal;
    b.) a data transmission device including:
       a controller adapted to control the operation of said data transmission device;
       a data storage device adapted to store data;
       a connection mechanism coupled to said controller and adapted to couple to an external data device for coupling serial data to said controller;
       an encoder for encoding serial data into encoded data;
       a radio transmitter coupled to said controller, said radio transmitter adapted to transmit said encoded data; and
    c.) a position determination device that is adapted to receive said converted correction signal and said encoded data, said position determination device adapted to use said converted correction signal for accurately determining position.

12. The network of claim 11 wherein said encoder is a software program stored in said memory storage device and adapted to operate on said controller.

13. The network of claim 11 wherein said controller is an application specific integrated circuit device and said encoder is an algorithm programmed into said application specific integrated circuit device.

* * * * *